United States Patent
Grossman et al.

(10) Patent No.: US 12,008,291 B2
(45) Date of Patent: Jun. 11, 2024

(54) TECHNIQUES FOR DESIGNING INTERACTIVE OBJECTS WITH INTEGRATED SMART DEVICES

(71) Applicant: AUTODESK, INC., San Francisco, CA (US)

(72) Inventors: Tovi Grossman, Toronto (CA); Fraser Anderson, Camrose (CA); Ryan Michael Schmidt, Toronto (CA); Saul Greenberg, Canmore (CA); David Ledo Maira, Calgary (CA)

(73) Assignee: AUTODESK, INC., San Francisco, CA (US)

( * ) Notice: Subject to any disclaimer, the term of this patent is extended or adjusted under 35 U.S.C. 154(b) by 588 days.

(21) Appl. No.: 15/863,767

(22) Filed: Jan. 5, 2018

(65) Prior Publication Data

US 2018/0196889 A1     Jul. 12, 2018

Related U.S. Application Data

(60) Provisional application No. 62/443,624, filed on Jan. 6, 2017.

(51) Int. Cl.
| | |
|---|---|
| *G06F 30/00* | (2020.01) |
| *G06F 30/333* | (2020.01) |
| *G06F 111/02* | (2020.01) |
| *G06T 19/00* | (2011.01) |

(52) U.S. Cl.
CPC .......... *G06F 30/00* (2020.01); *G06F 30/333* (2020.01); *G06F 2111/02* (2020.01); *G06T 19/00* (2013.01); *G06T 2200/24* (2013.01); *G06T 2219/016* (2013.01)

(58) Field of Classification Search
CPC .... G06F 30/00; G06F 30/333; G06F 2111/02; G06T 2200/24; G06T 19/00; G06T 2219/016
See application file for complete search history.

(56) References Cited

U.S. PATENT DOCUMENTS

| | | | | |
|---|---|---|---|---|
| 2002/0099473 A1* | 7/2002 | Amadeo | ............ | G05B 19/4097 700/251 |
| 2003/0046061 A1* | 3/2003 | Preston | ................... | G06F 8/436 704/9 |
| 2009/0134218 A1* | 5/2009 | Yuzon | ................... | G07F 7/1016 235/382 |

OTHER PUBLICATIONS

Chakravarthy, Y. Kalyana, et al. "Control Strategy of Prosthetic Leg Using Smart Device." International Journal on Cybernetics & Informatics (IJCI) vol. 4, No. 2, Apr. 2015.*

Terada, Tsutomu, and Masahiko Tsukamoto. "Smart object systems by event-driven rules." Proc. of the 1st International Workshop on Smart Object Systems. 2005.*

(Continued)

*Primary Examiner* — Bijan Mapar
(74) *Attorney, Agent, or Firm* — Artegis Law Group, LLP

(57) ABSTRACT

One embodiment of the present invention sets forth a technique for designing and generating a smart object. The technique includes receiving a first input indicating a smart object behavior of a smart object that includes a smart device embedded in a three-dimensional (3D) object; in response to the input, generating computer instructions for the smart device, wherein the computer instructions, when executed by the smart device, cause the smart object to implement the smart object behavior; and transmitting the computer instructions to the smart device.

24 Claims, 7 Drawing Sheets

(56) References Cited

OTHER PUBLICATIONS

Awad, M. I., Abouhossein, A., Dehghani-Sanij, A. A., Richardson, R., Moser, D., Zahedi, S., & Bradley, D. (2016). Towards a smart semi-active prosthetic leg: preliminary assessment and testing. IFAC-PapersOnLine, 49(21), 170-176. (Year: 2016).*
Arami, A., Rechenmann, J. D., & Aminian, K. (2014). Reference-free automated magnetic sensor calibration for angle estimation in smart knee prostheses. IEEE Sensors Journal, 14(6), 1788-1796. (Year: 2014).*
DeGol, J., Akhtar, A., Manja, B., & Bretl, T. (Aug. 2016). Automatic grasp selection using a camera in a hand prosthesis. In 2016 38th Annual International Conference of the IEEE Engineering in Medicine and Biology Society (EMBC) (pp. 431-434). IEEE. (Year: 2016).*
Piazza, C., Della Santina, C., Catalano, M., Grioli, G., Garabini, M., & Bicchi, A. (May 2016). Softhand pro-d: Matching dynamic content of natural user commands with hand embodiment for enhanced prosthesis control. In 2016 IEEE International Conference on Robotics and Automation (ICRA) (Year: 2016).*
Light, C. M., Chappell, P. H., Hudgins, B., & Engelhart, K. (2002). Intelligent multifunction myoelectric control of hand prostheses. Journal of medical engineering & technology, 26(4), 139-146. (Year: 2002).*
Riehle, T. H., Anderson, S. M., Lichter, P. A., Brown, A. W., & Hedin, D. S. (Aug. 2011). Public transportation assistant for the cognitively impaired. In 2011 Annual International Conference of the IEEE Engineering in Medicine and Biology Society (pp. 7585-7588). IEEE. (Year: 2011).*
Ashbrook et al., "Nenya: Subtle and Eyes-Free Mobile Input with a Magnetically-Tracked Finger Ring", Proceedings of the SIGCHI Conference on Human Factors in Computing Systems (CHI '11), ACM, http://doi.org/10.1145/1978942.1979238, May 7-12, 2011, pp. 2043-2046.
Azizyan et al., "SurroundSense: Mobile Phone Localization via Ambience Fingerprinting", Proceedings of the 15th annual international conference on Mobile computing and networking, ACM, Retrieved Sep. 18, 2016 http://dl.acm.org/citation.cfm?id=1614350, Sep. 20-25, 2009, pp. 261-272.
Baudisch et al., "Lumino: Tangible Blocks for Tabletop Computers Based on Glass Fiber Bundles", Proceedings of the SIGCHI Conference on Human Factors in Computing Systems (CHI '10), ACM, http://doi.org/10.1145/1753326.1753500, Apr. 10-15, 2010, pp. 1165-1174.
Booth et al., "Crossed Wires: Investigating the Problems of End-User Developers in a Physical Computing Task", Proceedings of the 2016 CHI Conference on Human Factors in Computing Systems, ACM, Retrieved Sep. 18, 2016 from http://dl.acm.org/citation.cfm?id=2858533, 2016, pp. 3485-3497.
Chen et al., "Encore: 3D Printed Augmentation of Everyday Objects with Printed-Over, Affixed and Interlocked Attachments", To appear in Proceedings of the ACM symposium on User Interface Software and Technology, DOI: http://dx.doi.org/10.1145/2807442.2807498, Nov. 8-11, 2015, pp. 73-82.
Chen et al., "Reprise: A Design Tool for Specifying, Generating, and Customizing 3D Printable Adaptations on Everyday Objects", ACM UIST, http://dx.doi.org/10.1145/2984511.2984512, Oct. 16-19, 2016, pp. 29-39.
Follmer et al., "CopyCAD: Remixing Physical Objects with Copy and Paste from the Real World", Adjunct Proceedings of the 23Nd Annual ACM Symposium on User Interface Software and Technology (UIST '10), ACM, http://doi.org/10.1145/1866218.1866230, Oct. 3-6, 2010, pp. 381-382.
Follmer et al., "kidCAD: Digitally Remixing Toys Through Tangible Tools", Proceedings of the SIGCHI Conference on Human Factors in Computing Systems (CHI '12), ACM, http://doi.org/10.1145/2207676.2208403, May 5-10, 2012, pp. 2401-2410.
Gupta et al., "SoundWave: Using the Doppler Effect to Sense Gestures", Proceedings of the SIGCHI Conference on Human Factors in Computing Systems (CHI '12), ACM, http://doi.org/10.1145/2207676.2208331, May 5-10, 2012, pp. 1911-1914.
Hudson et al., "Understanding Newcomers to 3D Printing: Motivations, Workflows, and Barriers of Casual Makers", Proceedings of the SIGCHI Conference on Human Factors in Computing Systems, Retrieved Sep. 18, 2016 from http://www.mansci.uwaterloo.ca/~pchilana/HudsonCHI16.pdf, DOI: http://dx.doi.org/10.1145/2858036.2858266, May 7-12, 2016, pp. 384-396.
Lazik et al., "Indoor Pseudo-ranging of Mobile Devices using Ultrasonic Chirps", Proceedings of the 10th ACM Conference on Embedded Network Sensor Systems, Retrieved Sep. 18, 2016 from http://dl.acm.org/citation.cfm?id=2426667, ACM, Nov. 6-9, 2012, pp. 99-112.
Ohbuchi et al., "Barcode Readers Using the Camera Device in Mobile Phones", International Conference on Cyberworlds, http://doi.org/10.1109/CW.2004.23, 2004, pp. 260-265.
Ono et al., "Touch & Activate: Adding Interactivity to Existing Objects Using Active Acoustic Sensing", Proceedings of the 26th Annual ACM Symposium on User Interface Software and Technology (UIST '13), ACM, http://doi.org/10.1145/2501988.2501989, Oct. 8-11, 2013, pp. 31-40.
Ou et al., "Cilllia: 3D Printed Micro-Pillar Structures for Surface Texture, Actuation and Sensing", Proceedings of the 2016 CHI Conference on Human Factors in Computing Systems (CHI '16), ACM, http://doi.org/10.1145/2858036.2858257, May 7-12, 2016, pp. 5753-5764.
Ramakers et al., "RetroFab: A Design Tool for Retrofitting Physical Interfaces Using Actuators", Sensors and 3D Printing. Proceedings of the 2016 CHI Conference on Human Factors in Computing Systems (CHI '16), ACM, http://doi.org/10.1145/2858036.2858485, May 7-12, 2016, pp. 409-419.
Sato et al., "Touche: Enhancing Touch Interaction on Humans, Screens, Liquids, and Everyday Objects", Proceedings of the SIGCHI Conference on Human Factors in Computing Systems (CHI '12), ACM, http://doi.org/10.1145/2207676.2207743, May 5-10, 2012, pp. 483-492.
Savage et al., "Sauron: Embedded Single-Camera Sensing of Printed Physical User Interfaces", Proceedings of the 26th Annual ACM Symposium on User Interface Software and Technology (UIST '13), ACM, http://doi.org/10.1145/2501988.2501992, Oct. 8-11, 2013, pp. 447-456.
Savage et al., "Makers' Marks: Physical Markup for Designing and Fabricating Functional Objects", Proceedings of the 28th Annual ACM Symposium on User Interfaces and Software Technology (UIST '15), ACM, http://dx.doi.org/10.1145/2807442.2807508, Nov. 9-11, 2015, pp. 103-108.
Savage et al., "Lamello: Passive Acoustic Sensing for Tangible Input Components", Proceedings of the 33rd Annual ACM Conference on Human Factors in Computing Systems (CHI '15), ACM, http://doi.org/10.1145/2702123.2702207, Apr. 18-23, 2015, pp. 1277-1280.
Savage et al., "A Series of Tubes: Adding Interactivity to 3D Prints Using Internal Pipes", Proceedings of the 27th Annual ACM Symposium on User Interface Software and Technology (UIST '14), ACM, http://doi.org/10.1145/2642918.2647374, Oct. 5-8, 2014, pp. 3-12.
Savage et al., "Midas: Fabricating Custom Capacitive Touch Sensors to Prototype Interactive Objects", Proceedings of the 25th Annual ACM Symposium on User Interface Software and Technology (UIST '12), ACM, http://doi.org/10.1145/2380116.2380189, Oct. 7-10, 2012, pp. 579-588.
Schmitz et al., "Capricate: A Fabrication Pipeline to Design and 3D Print Capacitive Touch Sensors for Interactive Objects", Proceedings of the 28th Annual ACM Symposium on User Interface Software & Technology (UIST '15), ACM, http://doi.org/10.1145/2807442.2807503, Nov. 8-11, 2015, pp. 253-258.
Scott et al., "Sensing Foot Gestures from the Pocket", Proceedings of the 23Nd Annual ACM Symposium on User Interface Software and Technology (UIST '10), ACM, http://doi.org/10.1145/1866029.1866063, Oct. 3-6, 2010, pp. 199-208.
Teibrich et al., "Patching Physical Objects", Proceedings of the 28th Annual ACM Symposium on User Interface Software & Technol-

(56) References Cited

OTHER PUBLICATIONS ogy (UIST '15), ACM, DOI: http://dx.doi.org/10.1145/2807442. 2807467, Nov. 8-11, 2015, pp. 83-91.

Thingiverse.com. MakerBot Thingiverse. http://www.thingiverse. com. Snapshot dated Dec. 24, 2016 retrieved from https://web. archive.org/web/20161224070438/http://www.thingiverse.com/ Jan. 9, 2020, 4 pages.

Weichel et al., "MixFab: A Mixed-Reality Environment for Personal Fabrication", Proceedings of the 32Nd Annual ACM Conference on Human Factors in Computing Systems (CHI '14), ACM, http://doi. org/10.1145/2556288.2557090, Apr. 26-May 1, 2014, pp. 1-10.

Yamanaka et al., "Vibkinesis: Notification by Direct Tap and "Dying Message" Using Vibronic Movement Controllable Smartphones", Proceedings of the 27th Annual ACM Symposium on User Interface Software and Technology (UIST 14), ACM, http://doi.org/10.1145/ 2642918.2647365, Oct. 5-8, 2014, pp. 535-540.

Yu et al., "Clip-on Gadgets: Expanding Multi-touch Interaction Area with Unpowered Tactile Controls", Proceedings of the 24th Annual ACM Symposium on User Interface Software and Technology (UIST '11), ACM, http://doi.org/10.1145/2047196.2047243 , Oct. 16-19, 2011, pp. 367-372.

Smartboy Development Kit. Hyperkin Lab. http://hyperkinlab.com/ smartboy-development-kit/. Snapshot dated Dec. 25, 2016 retrieved from https://web.archive.org/web/20161225104712/http://hyperkinlab. com/smartboy-development-kit/, 2 pages.

Industrial Fiber Optics. http://www.i-fiberoptics.com/. Snapshot dated Dec. 30, 2016 retrieved from https://web.archive.org/web/ 20161230112136/http://www.i-fiberoptics.com/, 1 page.

Google Cardboard—Google VR. https://vr.google.com/cardboard/. Snapshot dated Dec. 31, 2016 retrieved from https://web.archive. org/web/20161231231633/https://vr.google.com/cardboard/, 5 pages.

"Cycloramic". Cycloramic.com, URL: http://www.cycloramic.com/ iPhone6/index_main.html, retrieved from https://web.archive.org/ web/20170615183257/http://www.cycloramic.com/iPhone6/index_ main.html, Snapshot dated Jun. 15, 2017, 5 pages.

3D Models for Professionals :: TurboSquid. http://www.turbosquid. com/. Snapshot dated Dec. 24, 2016 retrieved from https://web. archive.org/web/20161224084324/http://www.turbosquid.com/, 7 pages.

Laput et al. 2015. Acoustruments: Passive, Acoustically-Driven, Interactive Controls for Handheld Devices. In Proceedings of the 33rd Annual ACM Conference on Human Factors in Computing Systems (CHI '15), ACM, pp. 2161-2170. DOI:https://doi.org/10. 1145/2702123.2702414.

Weiss et al. 2009. SLAP widgets: bridging the gap between virtual and physical controls on tabletops. In Proceedings of the SIGCHI Conference on Human Factors in Computing Systems (CHI '09), ACM, pp. 481-490. DOI:https://doi.org/10.1145/1518701.1518779.

\* cited by examiner

TECHNIQUES FOR DESIGNING INTERACTIVE OBJECTS WITH INTEGRATED SMART DEVICES

CROSS-REFERENCE TO RELATED APPLICATIONS

This application claims priority benefit of the United States Provisional Patent Application titled, "BRINGING PASSIVE OBJECTS TO LIFE WITH EMBEDDED MOBILE DEVICES," filed on Jan. 6, 2017 and having Ser. No. 62/443,624. The subject matter of this related application is hereby incorporated herein by reference.

BACKGROUND OF THE INVENTION

Field of the Invention

The present invention relates generally to computer-aided design and, more specifically, to techniques for designing interactive objects with integrated smart devices.

Description of the Related Art

Smart objects are devices that include digital capabilities with some form of sensing, connectivity, and/or interactive capabilities. Many smart objects are now available to consumers, including consumer electronics, appliances, and toys, and smart objects are quickly becoming central to developing systems, such as the Internet of things and ubiquitous computing systems. Smart objects have a wide range of form factors and applications and continue to become "smarter" with increased connectivity, richer machine-based and human-based interactions, and more complex sensors to better understand their respective environments.

However, prototyping and testing different smart objects is not a trivial process. More specifically, designing and testing the performance of each smart object requires an in-depth understanding of both software and hardware components, including identifying, acquiring, assembling, and programming the appropriate electronics for the specific functionality and application associated with the smart object. In addition, creating a three-dimensional form-factor for the smart object that both reflects the desired user experience and houses the required circuitry and electronics requires extensive experience with computer-aided design software. Accordingly, only individual designers with wide-ranging experience or a team of designers that collectively has the required experience can successfully prototype smart objects.

As the foregoing illustrates, what is needed in the art are more effective techniques for designing and prototyping smart objects.

SUMMARY

One embodiment of the present invention sets forth a technique for generating a smart object. The technique includes receiving a first input indicating a smart object behavior of a smart object that includes a smart device embedded in a three-dimensional (3D) object; in response to the input, generating computer instructions for the smart device, wherein the computer instructions, when executed by the smart device, cause the smart object to implement the smart object behavior; and transmitting the computer instructions to the smart device.

At least one advantage of the disclosed techniques is that a user can generate a smart object and specify high-level interactive behaviors of the smart object without designing specialized circuits or control systems, or writing and debugging control logic. An additional advantage is that a smart device can be easily incorporated into a prototype smart object. The behavior of the smart device can then be easily tested or modified by changing behavior parameters via the visual programming interface, rather than by reprogramming software or redesigning circuitry for the smart object. These advantages provide a technological improvement over prior art techniques, in which prototyping and testing an interactive smart device is an involved and multifaceted process.

BRIEF DESCRIPTIONS OF THE DRAWINGS

Figure 6A:
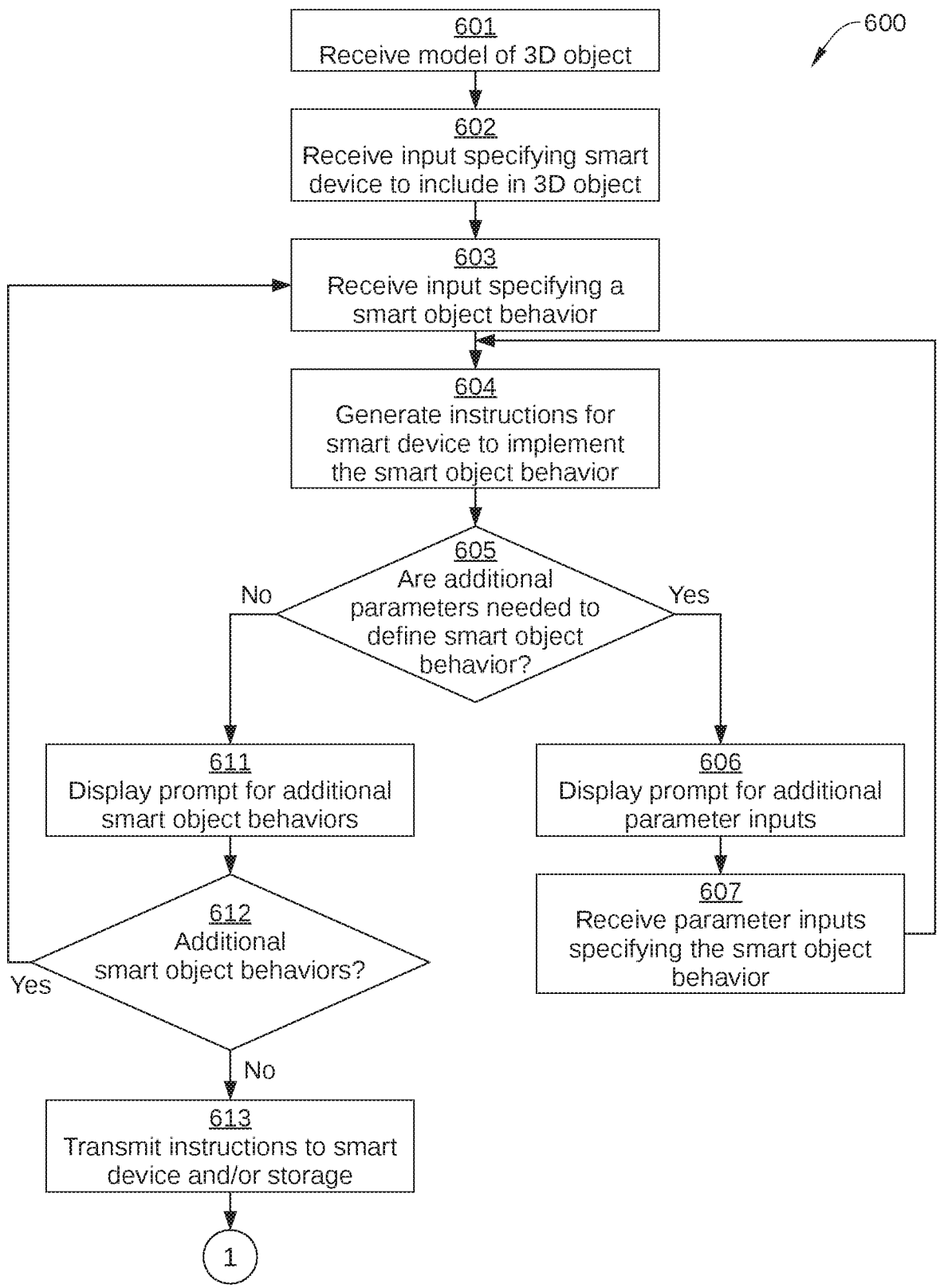
Figure 6B:
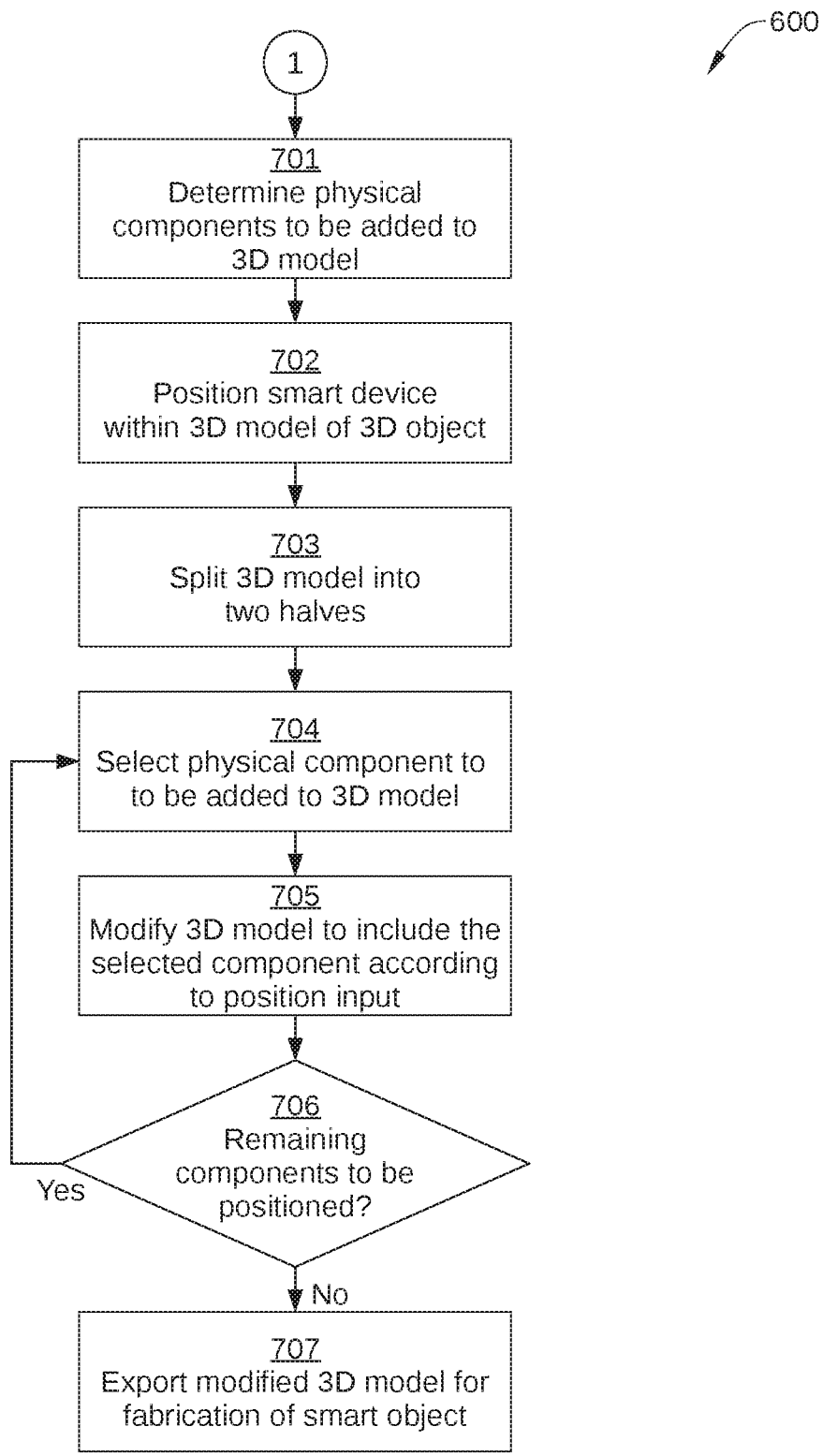

FIGS. 6A-6B set forth a flowchart of method steps for designing and generating a smart object, according to various embodiments of the present invention.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
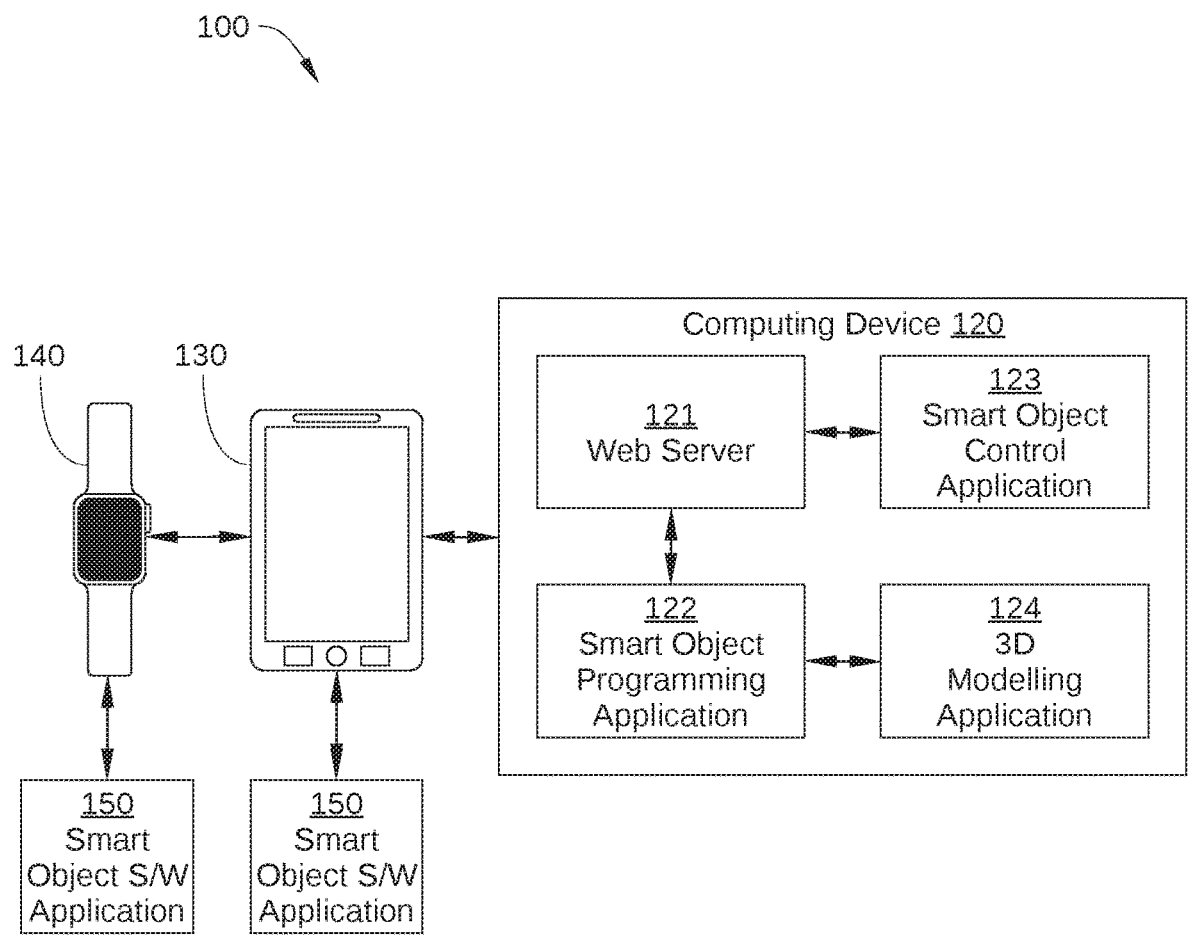
FIG. 1 is a block diagram of smart object design system configured to implement one or more aspects of the present invention.

FIG. 1 is a block diagram of a smart object design system 100 configured to implement one or more aspects of the present invention. Smart object design system 100 includes a computing device 120, a smart device 130, and, in some embodiments, a wearable smart device 140.

Smart object design system 100 enables a designer to implement high-level behaviors in a smart object via a drag-and-drop or other visual programming interface. Code is then generated based on the smart object behaviors and associated input information selected by the designer. A first portion of the code is streamed to a smart device (e.g., smart device 130 or wearable smart device 140) that is to be embedded in the smart object being designed, and a second portion of the code resides in a computing device that controls the smart object. The first portion of the code enables the smart device to process inputs to and to generate outputs from the smart device, while the second portion of the code enables computing device 120 to control the smart behaviors of the smart object. Smart object design system 100 then guides the designer through simplified modeling tasks within a 3D modeling workspace to modify an existing 3D model so that the selected smart object behaviors can be performed by a smart object that is based on the 3D model. Such a smart object can then be produced by embedding a smart device programmed with the first portion of the code into a 3D object that is formed using the modified 3D model and standard 3D printing technology. Thus, smart object design system 100 enables hobbyists, makers, and interaction designers to rapidly prototype and test different interactive smart device behaviors without the need for advanced 3D modelling, programming, or electronic assembly skills.

Smart device 130 is a smart device capable of wireless communication, receiving physical inputs, and generating one or more physical outputs. In some embodiments, smart device 130 is capable of receiving a touch-based input, an image-based input, a magnet-based input, a motion-based input, an orientation-based input, and/or a sound-based input. In some embodiments, smart device 130 is also capable of generating a light-based output, a sound-based output, and/or a vibration or other haptic output. For example, smart device 130 can be a smart phone or an electronic tablet.

In operation as part of smart object design system 100, smart device 130 executes a smart object software application 150 that streams sensor data from smart device 130 to a smart object control application 123 (executed by computing device 120) via a web server 121. In addition, smart object software application 150 receives and implements control inputs from a smart object control application 123 (executed by computing device 120) via web server 121. For example, when smart device 130 receives a particular touch input, such as a capacitive input received by a display screen of smart device 130, smart object software application 150 then transmits sensor data generated in response to the particular touch input to smart object control application 123. The sensor data transmitted to smart object control application 123 may include (1) input data indicating that a capacitive input has been received and (2) location data referencing the specific portion of the display screen of smart device 130 where the particular touch input was received. Based on the sensor data transmitted by smart object software application 150, software smart object control application 123 can determine a suitable output in response to the particular touch input, and transmit control signals to smart object software application 150. Smart object software application 150 receives the control signals and causes smart device 130 to generate the suitable output. As noted, the suitable output generated by smart device 130 may include one or more of a light-based output, a sound-based output, and/or a vibration or other haptic output.

Consequently, when smart device 130 is embedded in a suitably designed smart object and programmed with smart object software application 150, the smart object is enabled to receive specific inputs or recognize specific events that are programmed into smart object software application 150. The smart object is further enabled to perform specific functions or generate specific outputs according to the programming included in smart object software application 150 and the inputs received from smart object control application. Advantageously, such a smart object has such functionality without a specialized control system, sensor system, power supply, or wireless interface capability. Instead, the selected smart object behaviors of such a smart object are enabled by embedding smart device 130 within the smart object. In addition, certain physical features can be included in the design of the smart object that enable the outputs generated by smart device 130 to be realized as the selected smart object behaviors. Further, constantly streaming data from smart device 130 to smart object control application 123 allows for live debugging and interactive reprogramming of the smart object in which smart device 130 is embedded.

Wearable smart device 140 is a wearable smart device having some or all of the capabilities described above for smart device 130. For example, wearable smart device 140 can be a smart watch. In some embodiments, wearable smart device 140 communicates with smart object control application 123 via web server 121, and in other embodiments, wearable smart device 140 communicates with smart object control application 123 via a combination of smart device 130 and web server 121. In operation as part of smart object design system 100, wearable smart device 140 executes smart object software application 150 in a similar fashion as smart device 130, as set forth above.

Computing device 120 includes web server 121 and executes smart object programming application 122 and smart object control application 123. In some embodiments, computing device 120 also executes a 3D modelling application 124. Computing device 120 can be any computing device suitable for practicing one or more embodiments of the present invention. One embodiment of computing device 120 is illustrated in FIG. 2.

Figure 2:
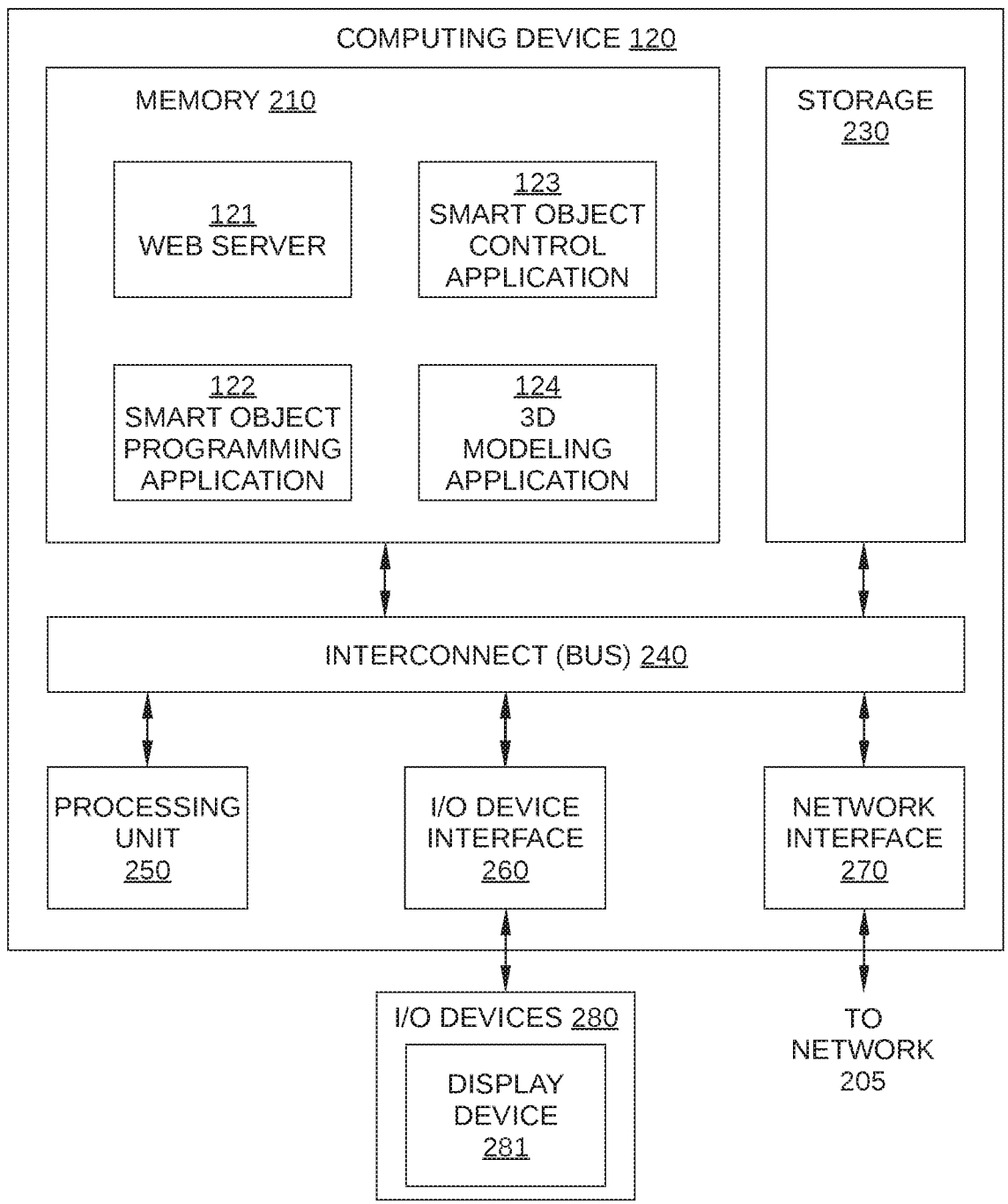
FIG. 2 is a more detailed illustration of the computing device of FIG. 1, according to various embodiments of the invention.

FIG. 2 is a more detailed illustration of computing device 120, according to various embodiments of the invention. Computing device 120 may be a desktop computer, a laptop computer, a tablet computer, or any other type of computing device configured to receive input, process data, generate control signals, and display images. Computing device 120 is configured to run smart object programming application 122, smart object control application 123, and/or 3D modelling application 124, which reside in a memory 210. It is noted that the computing device described herein is illustrative and that any other technically feasible configurations fall within the scope of the present invention.

As shown, computing device 120 includes, without limitation, an interconnect (bus) 240 that connects a processing unit 250, an input/output (I/O) device interface 260 coupled to input/output (I/O) devices 280, memory 210, a storage 230, and a network interface 270. Processing unit 250 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 250 may be any technically feasible hardware unit capable of processing data and/or executing software applications, including smart object programming application 122, smart object control application 123, and/or 3D modelling application 124. Further, in the context of this disclosure, the computing elements shown in computing device 120 may correspond to a physical computing system (e.g., a system in a data center) or may be a virtual computing instance executing within a computing cloud.

I/O devices 280 may include devices capable of providing input, such as a keyboard, a mouse, a touch-sensitive screen, and so forth, as well as devices capable of providing output, such as a display device 281. Additionally, I/O devices 280 may include devices capable of both receiving input and providing output, such as a touchscreen, a universal serial bus (USB) port, and so forth. I/O devices 280 may be configured to receive various types of input from an end-user of computing device 120, and to also provide various types of output to the end-user of computing device 120, such as displayed digital images or digital videos. In some embodiments, one or more of I/O devices 280 are configured to couple computing device 120 to a network 205.

Network 205 may be any technically feasible type of communications network that allows data to be exchanged between computing device 120 and external entities or devices, such as smart device 130, wearable smart device 140, a web server, or another networked computing device. For example, network 205 may include a wide area network (WAN), a local area network (LAN), a wireless (WiFi) network, a Bluetooth network and/or the Internet, among others.

Memory 210 may include a random access memory (RAM) module, a flash memory unit, or any other type of memory unit or combination thereof. Processing unit 250, I/O device interface 260, and network interface 270 are configured to read data from and write data to memory 210. Memory 210 includes various software programs that can be executed by processor 250 and application data associated with said software programs, including smart object programming application 122, smart object control application 123, and/or 3D modelling application 124.

Returning now to FIG. 1, web server 121 includes a wireless transceiver, and enables wireless communications between computing device 120 and smart device 130. For example, in some embodiments, web server 121 includes a Node JS server running on computing device 120. In some embodiments, web server 121 also enables wireless communications directly between computing device 120 and wearable smart device 140.

Smart object programming application 122 is a software application executed on computing device 120 and configured to enable a user to specify high-level interactive behaviors via a visual programming interface. In addition, smart object programming application 122 is configured to modify a 3D model via a guided modelling process to generate a 3D model for forming a smart object. The 3D model is configured so that a smart device can be embedded therein and used as the input detection and output generation portion of a smart device. A smart object having a form factor based on a 3D model modified by smart object programming application 122 can physically accommodate smart device 130 or wearable smart device 140 in a way that enables the smart device to receive certain physical inputs when the smart object is exposed to the physical inputs. In addition, the smart object can physically accommodate the smart device in a way that enables the smart object to generate certain physical outputs. For example, the smart object can simulate an LED output by routing a light output from the screen of the smart device to a certain location in the smart object. As a result, the smart device embedded within the smart object can serve as an interpreter of physical inputs and a generator of appropriate physical outputs. In this way, a suitably programmed smart device can be incorporated into an interactive smart object as the computing resource of the smart object.

In the embodiments illustrated in FIGS. 1 and 2, computing device 120 performs certain visual programming, coding, model generation, and other functions. In alternative embodiments, some or all of the functionality described herein for computing device 120 is included in smart device 130 or wearable smart device 140. For example, in an embodiment in which smart object design system 100 does not include computing device 120, smart device 130 or wearable smart device 140 may execute smart object programming application 122, smart object control application 123, and/or 3D modelling application 124.

Visual Programming Interface

Figure 3:
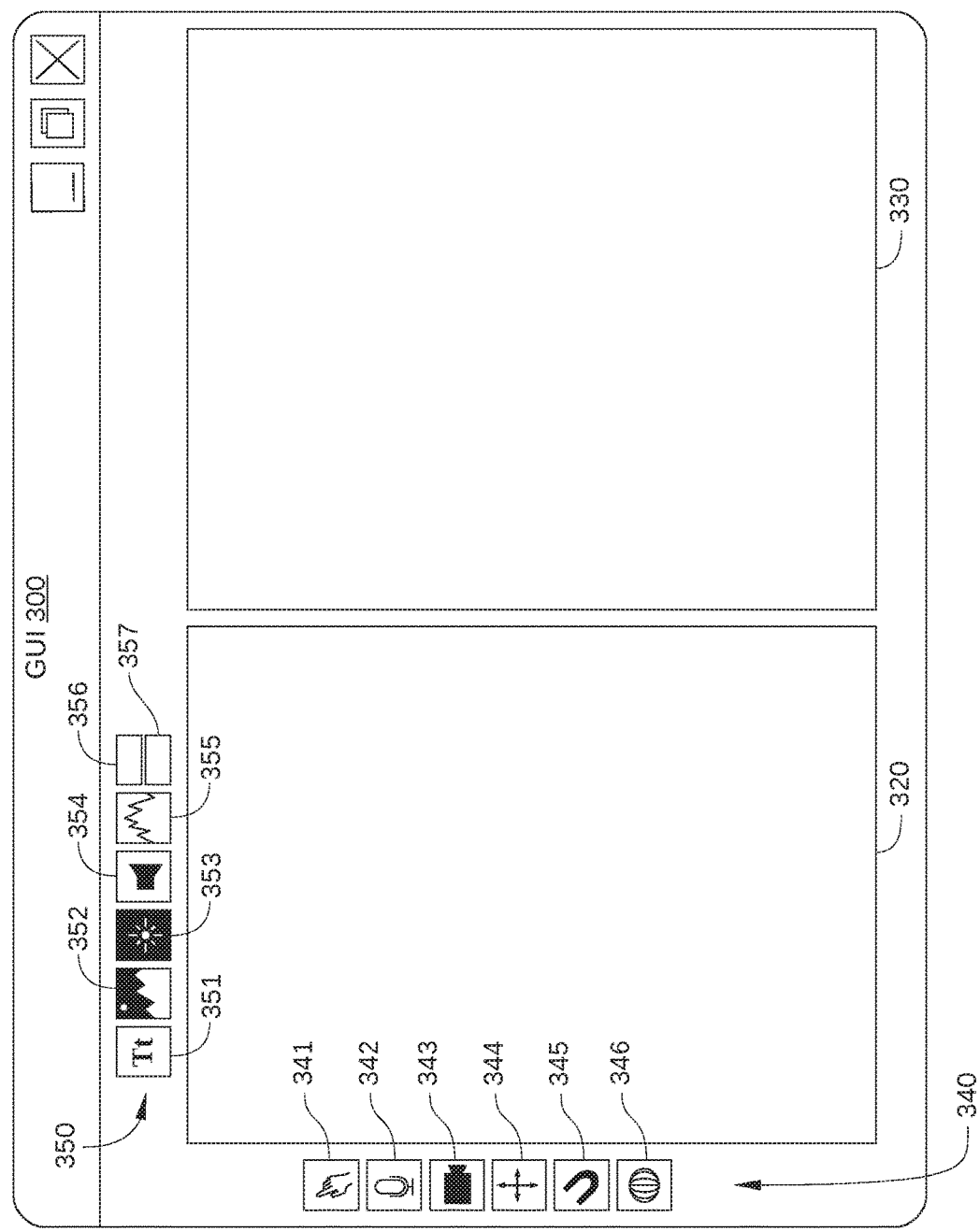
FIG. 3 is a schematic illustration of a graphical user interface (GUI) that displays a visual programming interface, according to various embodiments of the invention.

In some embodiments, the visual programming interface generated by smart object programming application 122 is displayed via a graphical user interface (GUI) displayed on display device 281. One such embodiment is illustrated in FIG. 3. FIG. 3 is a schematic illustration of a GUI 300 that displays a visual programming interface, according to various embodiments of the invention. GUI 300 includes a visual programing panel 320 that enables a designer to prototype and test specific smart object behaviors, such as generating a physical output when the smart object is exposed to a specific physical input. Visual programing panel 320 allows a designer with no programming skills to intuitively input parameters for inputs to and outputs from the smart object. GUI 300 also includes a 3D modelling panel 330 that enables a designer to dynamically modify an imported 3D model of a base object into a 3D model of a smart object in which a smart device can be embedded and generate specified physical outputs. GUI 300 further includes a plurality of input event buttons 340 and a plurality of output action buttons 350.

3D modelling panel 330 is an interactive 3D-modelling canvas included in the visual programming interface that updates as a designer modifies the high-level behaviors implemented in the smart object. When additional actions are required to fully define a particular smart object behavior, the visual programming interface prompts the designer for the requisite additional information. In some embodiments, the functionality of 3D modelling panel 330 is provided by 3D modelling application 124 (shown in FIG. 1). Alternatively, the functionality of 3D modelling panel 330 can be incorporated in smart object programming application 122.

Input event buttons 340 include buttons for selecting an event, user input, or other physical input to which a specific physical output is to be generated by the smart object being designed. In the embodiment illustrated in FIG. 3, input event buttons 340 include a touch input button 341, a sound-based input button 342, a visual (camera-based) input button 343, a motion-based input button 344, a magnetic input button 345, and a global positioning system (GPS) event button 346. Touch input button 341 initiates the process of defining a touch-based input received by the smart device, such as a touch input to a specific location of the screen of the smart device that is embedded in the smart object. For example, selection of touch input button 341 can initiate the display of drop-down menus or user prompt windows that further enable the designer to define the touch input, such as the duration of the touch, the location of the touch on the smart device screen (when exposed), and whether the touch is a single tap, double tap, or swipe. In embodiments in which the screen of the smart device is not exposed when embedded in the smart object, a capacitive button and/or trace may be included in the smart object to transfer a user touch at the exterior of the smart object to the screen of the smart device.

Similarly, selection of sound-based input button 342 initiates the process of defining an input received by a microphone of the smart device, such as a voice input or other sound-based input. Selection of visual input button 343 initiates the process of defining an input received by a camera of the smart device, such as an average light level sensed, a color sensed, or a particular class of object detected by the smart device via computer vision. Selection of motion-based input button 344 initiates the process of defining an input received by an accelerometer of the smart device, such as a specific motion, gesture, orientation, or magnitude of motion (shaking). Selection of magnetic input button 345 initiates the process of defining an input received by a magnetometer of the smart device, such as holding the smart object near a magnet, or the motion of an actuator or switch of the smart object that includes a magnet. Selection of GPS event button 346 initiates the process of defining an input or event based on the current location of the smart object.

Output action buttons 350 include buttons for selecting a function or other physical output to be performed by the smart device, typically in response to a specific input or event. In the embodiment illustrated in FIG. 3, output event buttons 350 include a display text button 351, a display image button 352; an enable light output button 353, a play sound button 354, and a produce motion button 355. GUI 300 further includes two programmatic control buttons for variable features: a color group button 356 for selecting a color of a light output and a timer button 357 for specifying a certain period of time during which an action is performed and/or after which the action is performed.

Selection of one of output action buttons 350 initiates the process of defining an output or function, for example in response to an input defined by one of input event buttons 340. Similar to input event buttons 340, when one of output action buttons 350 is selected, a process is initiated by which an output or function to be performed by the smart device is defined. For example, a series of drop-down menus or user prompt windows may be displayed to guide a designer through the process of defining relevant parameters associated with the function, such as magnitude and/or frequency of vibration, magnitude and/or color of light output, location on the screen of the smart device at which the light output is implemented, etc. In some embodiments, input event buttons 340 can be employed in conjunction with color group button 356 and/or timer button 357 for a more detailed definition of the output action to be performed by the smart object. One such embodiment is illustrated in FIG. 4.

Figure 4:
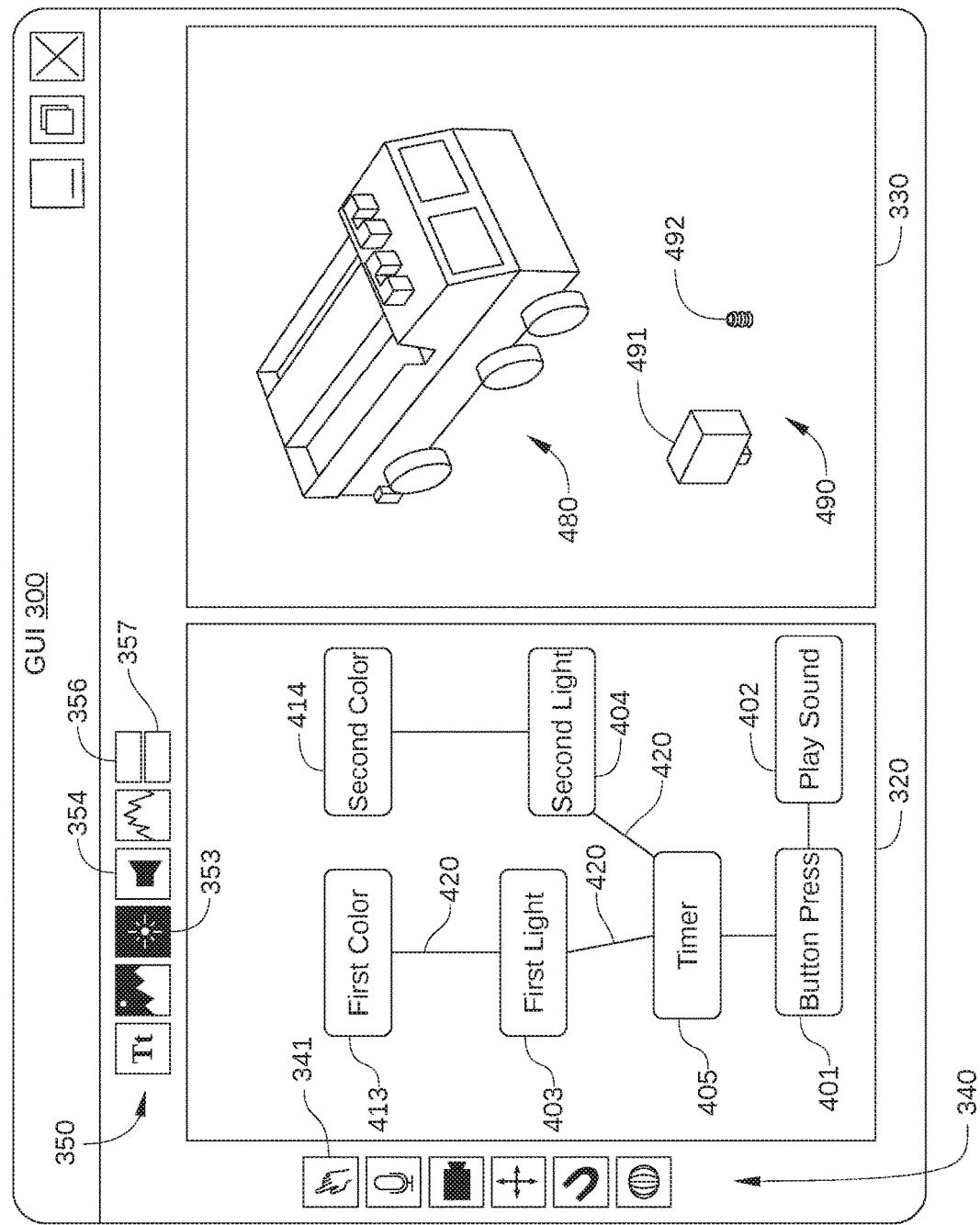
FIG. 4 is an illustration of the GUI of FIG. 3 displaying a smart object behavior selection process, according to various embodiments of the invention.

FIG. 4 is an illustration of GUI 300 displaying a smart object behavior definition process, according to various embodiments of the invention. As shown, resultant programming elements (401, 402, 403, 404, 405, 413, 414, and 420) are displayed in visual programing panel 320 when a designer selects an input and corresponding behaviors as part of the smart object behavior definition process for a smart object.

In the embodiment illustrated in FIG. 4, a button press input 401 is shown in the visual programming interface when the designer selects touch input button 341 and a play sound output box 402 is shown when the designer drags the play sound button 354 onto visual programing panel 320. Using, for example, a drop-down menu (not shown), or a user prompt window (not shown), the designer selects a sound from an existing library of WAV or other suitable sounds files (e.g., a siren sound). A first light module 403 and a second light module 404 are shown in the visual programming interface when the designer drags two enable light output buttons 353 onto visual programing panel 320. In addition, when first light module 403 is displayed, smart object programming application 122 prompts the designer to provide additional output information to further define the light output associated with first light module 403, and the result of such designer input is displayed as a first color module 413. For example, the designer may be prompted for information to be input via color group button 356, including a specific color (e.g., white), brightness, and the like. Similarly, second color module 414 is displayed as the result of additional designer input associated with second light module 404, and indicates the color selected by the designer for the second light output (e.g., red). Selection of timer button 357 and associated designer input causes a timer module 405 to be displayed. Lastly, the logical connections 420 are displayed in response to designer graphical input. For example, logical connections 420 between button press input 401, play sound output box 402, first light module 403, second light module 404, timer module 405, first color module 413, and second color module 414 are displayed as shown in response to the designer dragging links between the appropriate programming elements. Alternatively or additionally, the designer may cause logical connections to be generated via any other technically feasible graphical connection or input procedure.

Upon completion of designer inputs via the visual programming interface of GUI 300, smart object programming application 122 generates appropriate code based on the content associated with button press input 401, play sound output box 402, first light module 403, second light module 404, timer module 405, first color module 413, and second color module 414, as well as on the logical connections 420 defined therebetween. Smart object programming application 122 then streams a first portion of the generated code to smart object software application 150 in the appropriate smart device (i.e., either smart device 130 or wearable smart device 140). In addition, smart object programming application 122 stores a second portion of the generated code in computing device 120 for control of the smart object. For example, the second portion of the generated code can be included in smart object control application 123.

Once a designer has defined smart device behaviors for a smart object via GUI 300 as set forth above, smart object programming application 122 can then perform a guided design process. Specifically, smart object programming application 122 guides a designer through the process of placing the physical components within an imported 3D model, which can then be fabricated using conventional 3D printing techniques. For example, based on prompts provided by smart object programming application 122, a designer can indicate locations on an imported 3D model for input mechanisms and/or output locations, when applicable. In some embodiments, an imported 3D model 480 is displayed in 3D modelling panel 330 of GUI 300, as shown in FIG. 4, and the designer can employ graphical inputs to provide requested information to smart object programming application 122 as part of the guided modelling process. In some embodiments, input or output mechanisms 490 that are generated by smart object programming application 122 are also displayed in 3D modelling panel 330, such as a capacitive button 491 (to be printed in a conductive material such as polylactide) and a button spring 492 (to be printed in an elastic material such as NinjaFlex).

In some embodiments, the order of modeling steps is predetermined, using a fixed rule-set. For example, in some embodiments, smart object programming application 122 positions the smart device as an initial or early step in the process, since light outputs and text outputs are generally implemented based on a specific position of the screen of the smart device being embedded. Subsequently, smart object programming application 122 instructs the user to place the location of light outputs when applicable, so that light-guiding structures can be generated within the imported 3D model that guide light from a suitable portion of the screen of the smart device to the selected location of the light output. For example, the 3D model may be modified to include curved paths of a suitable diameter that are formed to house a specific configuration of optic fiber or light pipe. Smart object programming application 122 also instructs the user to place the location of input features when applicable, such as a capacitive button or slider, a magnetic switch or slider, and the like.

Upon completion of the guided modelling process, smart object programming application 122 generates a 3D model of the smart object that is a modified version of the imported 3D model. The imported 3D model is automatically modified, based on the preceding designer inputs, to accommodate the incorporation of a selected smart device within the smart object. Thus, the 3D model is modified to include a cavity that accommodates the selected smart device. When the smart object is selected to have a behavior that is enabled by an exposed portion of the smart device, such as the screen or camera of the smart device, smart object programming application 122 positions the cavity at or near an appropriate surface of the smart object. For example, when the smart object includes a text-based output or an image-based output, smart object programming application 122 positions the screen of the smart device within the 3D model so that the requisite portion of the smart device is exposed. The smart device can be exposed by the removal of a suitable surface portion of the 3D model or by collocating the requisite portion of the smart device with a suitable surface of the smart object. In some embodiments, positioning of the screen is a designer input that is prompted by smart object programming application 122 during the above-described guided modelling process.

Figure 5:
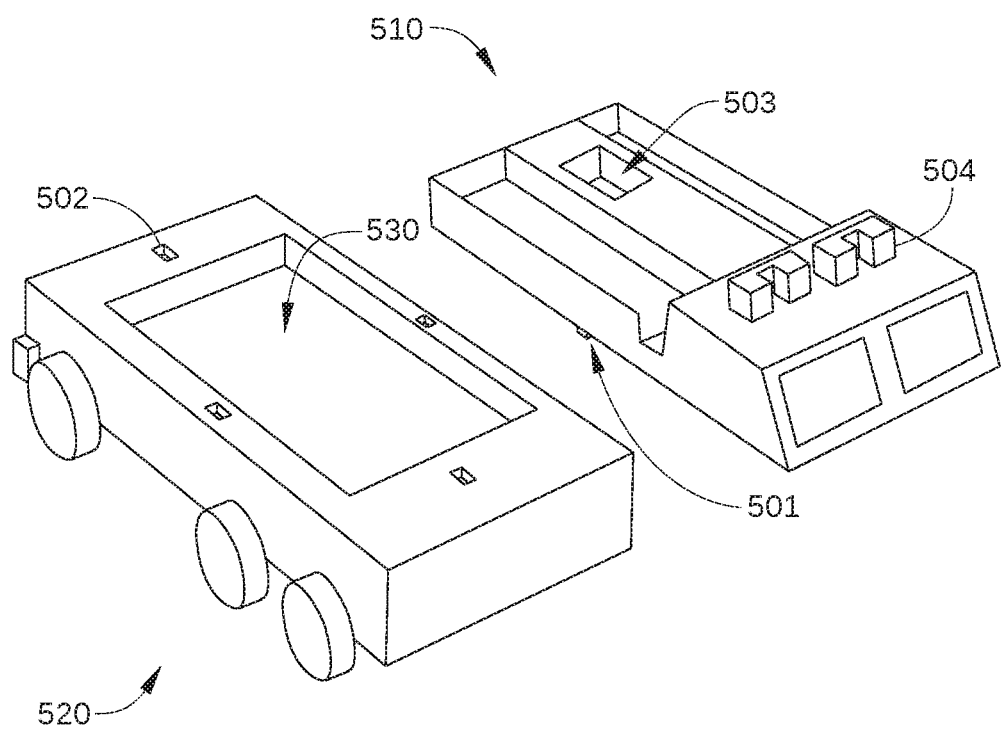
FIG. 5 is a schematic illustration of a three-dimensional (3D) model split into two pieces as part of an automated design process, according to various embodiments of the invention.

After the smart device is positioned, smart object programming application 122 automatically splits the 3D model into two pieces, as shown in FIG. 5. FIG. 5 is a schematic illustration of a 3D model split into two pieces as part of an automated design process, according to various embodiments of the invention. As shown, smart object programming application 122 separates imported 3D model 480 (shown in FIG. 4) into a top half 510 and a bottom half 520. In addition, smart object programming application 122 adds alignment pins 501 in one of the two halves and corresponding alignment holes 502 in the other of the two halves. Smart object programming application 122 further defines top half 510 and bottom half 520 with a cavity 530 that accommodates the smart device to be incorporated into the smart object formed by top half 510 and bottom half 520. Output features 504 are included in the modified 3D model, as well as any mechanism cavities 503 that are needed to accommodate mechanical input or output features of the smart object. For example, in the embodiment illustrated in FIG. 5, a mechanism cavity 503 is shown that accommodates conductive button 491 shown in FIG. 4.

After cavity 530 is defined and the 3D model is split into top half 510 and bottom half 520, smart object programming application 122 includes input and output features or mechanisms in the modified 3D model of the smart object as appropriate. These added input and output features or mechanisms enable the smart object to implement the behaviors selected by the designer via outputs generated by the smart device embedded in the smart object. For instance, to enable the location of a light output at a specific location that is not coincident with the screen of the smart device, smart object programming application 122 modifies the imported 3D model to include a channel that is configured to contain an optic fiber is routed from a screen surface of the smart device to the specific location, such as one of output features 504. Alternatively or additionally, one or more of the added input and output features or mechanisms may enhance an output generated by the smart device. In one such example, to enhance the capability of the smart device to detect sound-based inputs, smart object programming application 122 includes a hollow channel from an exterior surface of the smart object to the microphone of the smart device. Alternatively or additionally, in some embodiments, smart object programming application 122 includes physical features in the smart object that enable other functionalities of the smart object. For example, smart object programming application 122 can include a 3D printed tube that connects the built-in microphone and speakers of the smart device. This 3D tube can acts as a passive acoustic transducer to other input methods (e.g., tilt sensors, sliders, etc.), which allows the smart device to sense interactions with and without added electronics.

Design and Generation of Smart Object

FIGS. 6A and 6B set forth a flowchart of method steps for designing and generating a smart object, according to various embodiments of the present invention. Although the method steps are described in conjunction with the systems of FIGS. 1-4, persons skilled in the art will understand that any system configured to perform the method steps, in any order, is within the scope of the present invention.

As shown, a method 600 begins at step 601, where smart object programming application 122 receives a model of a 3D object on which the form factor of a smart object is to be based. For example, a user may cause the model to be transmitted to smart object programming application 122 via GUI 300.

In step 602, smart object programming application 122 receives an input specifying what smart device is to be included in the smart object being generated. For example, a user may indicate one of wearable smart device 140 or smart device 130 via GUI 300.

In step 603, smart object programming application 122 receives an input, for example from GUI 300, specifying a particular smart object behavior. Smart object behaviors can include, in response to a specified input or event, a text display, an image display, a light display, and/or sound generation, among others. The specified input or inputs can include discrete inputs (those that have an explicit triggering event) and continuous inputs (those that respond to changing, always available values). Discrete inputs can include a button push (directly to the smart device screen or via a mechanism formed from a conductive material), speech (such as word recognition), shaking or tapping of the smart object, orientation of the smart object, and web-based or GPS-based events. Continuous inputs can include sound or light level, orientation (where a continuous value is mapped to a specific output module), and web-based or GPS-based events or values.

In step 604, smart object programming application 122 generates instructions for the smart device to implement the smart object behavior defined in step 603. Alternatively, smart object programming application 122 generates instructions for all smart object behaviors after all smart object behaviors have been defined and prior to step 713.

In step 605, smart object programming application 122 determines whether additional parameters are needed to define the currently specified smart object behavior. If yes, method 600 proceeds to step 606; if no, method 600 proceeds to step 611.

In step 606, smart object programming application 122 displays a prompt or drop-down menu that requests the additional parameter inputs needed to define the currently specified smart object behavior. For example, for a light output in a smart object in which the screen of the embedded smart device is not exposed, a position on the surface of the smart object for the specified light output is requested from the designer by smart object programming application 122.

In step 607, smart object programming application 122 receives one or more parameter inputs via GUI 300 that specify the smart object behavior. Method 600 then proceeds back to step 604.

In step 611, smart object programming application 122 displays a prompt for additional smart object behaviors to be programmed into the smart object being generated.

In step 612, smart object programming application 122 determines whether additional smart object behaviors have been indicated by the designer. If yes, method 600 proceeds back to step 603; if no, method 600 proceeds to step 613.

In step 613, smart object programming application 122 transmits instructions to the smart device that is to be embedded in the smart object being generated. In some embodiments, smart object programming application 122 also stores a portion of the instructions for use by or incorporation into smart object control application 123. Upon completion of step 613, the designer has defined the behavioral description of the smart device being generated, and smart object programming application 122 has guided the designer through the process of placing physical components of the smart object associated with the behavioral description. Method 600 then proceeds to step 701 in FIG. 7.

In step 701, smart object programming application 122 determines the physical components to be added to the 3D model received in step 601. The physical components include one or more input mechanisms and/or one or more output mechanisms, as well as light guides, sound tunnels, and the like.

In step 702, smart object programming application 122 positions the smart device within the 3D model that is the basis for the morphology of the smart object being generated. As set forth above, the position may be based on designer inputs and/or on whether the screen of the smart device is to be exposed or fully embedded within the smart object.

In step 703, smart object programming application 122 splits the 3D model into two halves, such as a top half and a bottom half. The division plane is selected to intersect with the position of the smart device determined in step 702. Alignment pins are added to one half and corresponding alignment holes are added to the other half.

In step 704, smart object programming application 122 selects a physical component from the group of physical components determined in step 701.

In step 705, smart object programming application 122 modifies the 3D model to include the selected physical component.

In step 706, smart object programming application 122 determines whether there are any remaining physical components from the group of physical components to be included in the modified 3D model for generating the smart object. If yes, method 600 proceeds back to step 704; if no, method 600 proceeds to step 707.

In step 707, smart object programming application 122 exports the modified 3D model for fabrication of the smart object being generated. In some embodiments, 3D models for additional components are also exported for fabrication in step 707. For example, 3D models of components generated by smart object programming application 122 that are to be formed from different materials than the first and second halves of the smart object may also be exported for fabrication in step 707.

In sum, embodiments of the present invention provide techniques for generating a smart object. The smart object incorporates a smart device for interpreting physical inputs to the smart object and generating appropriate physical outputs for the smart object. A user enters parameters for high-level interactive behaviors of the smart object via a visual programming interface. In addition, the user graphically positions physical components of a 3D model of the smart object to enable specified behaviors of the smart object via the visual programming interface. The 3D model and associated physical components can then be fabricated using conventional 3D printing techniques.

At least one advantage of the disclosed techniques is that a user can generate a functional smart object and specify high-level interactive behaviors of the smart object without designing specialized circuits or control systems, or writing and debugging control logic. An additional advantage is that a smart device can be easily incorporated into a prototype smart object. The behavior of the smart device can then be easily tested or modified by changing behavior parameters via the visual programming interface, rather than by reprogramming software or redesigning circuitry for the smart object. These advantages provide a technological improvement over prior art techniques, in which prototyping and testing an interactive smart device is an involved and multifaceted process that requires extensive knowledge from many technical fields. By contrast, the techniques disclosed herein provide computer-aided techniques for designing a smart object, defining the behavior of the smart object, and modifying the behavior of the smart object.

1. In some embodiments, a method for designing and generating a smart object comprises: receiving a first input indicating a smart object behavior of a smart object that includes a smart device embedded in a three-dimensional (3D) object; in response to the input, generating computer instructions for the smart device, wherein the computer instructions, when executed by the smart device, cause the smart object to implement the smart object behavior; and transmitting the computer instructions to the smart device.

2. The method of clause 1, wherein the computer instructions cause the smart device to generate at least one of a text display, an image display, a screen-based light output, a sound output, and a haptic output.

3. The method of clauses 1 or 2, further comprising: receiving a 3D model of the 3D object; defining a cavity within the 3D model that accommodates the smart device; and separating the 3D model of the 3D object into a first half and a second half via a separation surface.

4. The method of any of clauses 1-3, further comprising: adding an alignment pin to the first half; adding an alignment hole to the second half, wherein the alignment hole aligns with the alignment pin when the first half and the second half are joined.

5. The method of any of clauses 1-4, prior to defining the cavity, receiving a second input indicating what smart device is to be embedded in the 3D object.

6. The method of any of clauses 1-5, prior to defining the cavity, receiving a second input indicating a location within the 3D object for the smart device.

7. The method of any of clauses 1-6, wherein the cavity is configured to leave at least a portion of one surface of the smart device exposed when the smart device is embedded in the 3D object.

8. The method of any of clauses 1-7, further comprising modifying the 3D model to include a mechanism that enables a physical input to be received by the smart device while embedded in the 3D object.

9. The method of any of clauses 1-8, further comprising modifying the 3D model to include a mechanism that enables the smart device to implement the smart object behavior while embedded in the 3D object.

10. In some embodiments, a non-transitory computer readable medium stores instructions that, when executed by a processor, cause the processor to perform the steps of: receiving a first input indicating a smart object behavior of a smart object that includes a smart device embedded in a three-dimensional (3D) object; in response to the input, generating computer instructions for the smart device, wherein the computer instructions, when executed by the smart device, cause the smart object to implement the smart object behavior; and transmitting the computer instructions to the smart device.

11. The non-transitory computer readable medium of clause 10, wherein the first input is generated and received via a visual programming interface.

12. The non-transitory computer readable medium of clauses 10 or 11, wherein the smart object behavior comprises a response to an event that is detected by the smart device.

13. The non-transitory computer readable medium of any of clauses 10-12, wherein the smart device detects the event via at least one of a camera, a magnetometer, a global positioning system, a microphone, a touchscreen, a Web interface, or an accelerometer.

14. The non-transitory computer readable medium of any of clauses 10-13, wherein the computer instructions cause the smart device to generate at least one of a text display, an image display, a screen-based light output, a sound output, and a haptic output.

15. The non-transitory computer readable medium of any of clauses 10-14, further comprising: receiving a 3D model of the 3D object; defining a cavity within the 3D model that accommodates the smart device; and separating the 3D model of the 3D object into a first half and a second half via a separation surface.

16. The non-transitory computer readable medium of any of clauses 10-15, further comprising: adding an alignment pin to the first half; adding an alignment hole to the second half, wherein the alignment hole aligns with the alignment pin when the first half and the second half are joined.

17. The non-transitory computer readable medium of any of clauses 10-16, prior to defining the cavity, receiving a second input indicating what smart device is to be embedded in the 3D object.

18. A system, comprising: a smart object that includes: a three-dimensional (3D) object configured to accommodate a smart device with a cavity; and the smart device; and a computing device that includes: a memory that stores instructions, and a processor that is coupled to the memory and, when executing the instructions, is configured to: receive a first input indicating a smart object behavior of the smart object; in response to the input, generating computer instructions for the smart device, wherein the computer instructions, when executed by the smart device, cause the smart object to implement the smart object behavior; and transmitting the computer instructions to the smart device.

19. The system of clause 18, wherein the smart device executes the computer instructions while disposed in the cavity.

20. The system of clauses 18 or 19, wherein the 3D object includes a physical feature that enables the smart device to implement the smart object behavior.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for designing and generating a smart object, the method comprising:
    displaying a plurality of input event buttons and a plurality of output action buttons via a graphical user interface (GUI), wherein each input event button represents a different type of input event that can initiate a smart object behavior of the smart object and each output action button represents a different type of output action that can be included in the smart object behavior;
    receiving, via the GUI, a selection of a first input event button included in the plurality of input event buttons for defining a first set of parameters for a first type of input event corresponding to the first input event button and a selection of a first output action button included in the plurality of output action buttons for defining a second set of parameters for a first type of output action corresponding to the first output action button;
    receiving a first input indicating the smart object behavior of the smart object that includes a smart device embedded in a three-dimensional (3D) object, wherein the smart object behavior is performed in response to an input event that is detected by the smart device, wherein the input event comprises at least one of an image-based input, a magnet-based input, a motion-based input, an orientation-based input, a touchscreen-based input, a sound-based input, or a global positioning system (GPS)-based input, wherein the first input includes the first set of parameters for the first type of input event and the second set of parameters for the first type of output action, wherein the input event comprises the first type of input event and the smart object behavior includes the first type of output action;
    in response to the first input, generating computer instructions for programming at least one function of the smart device, wherein the computer instructions, when executed by the smart device, cause the smart object to implement the smart object behavior; and
    transmitting, via a network, the computer instructions to the smart device.

2. The method of claim 1, wherein the computer instructions cause the smart device to generate at least one of a text display, an image display, a screen-based light output, a sound output, or a haptic output.

3. The method of claim 1, further comprising:
    receiving a 3D model of the 3D object;
    defining a cavity within the 3D model that accommodates the smart device; and
    separating the 3D model of the 3D object into a first half and a second half via a separation surface.

4. The method of claim 3, further comprising:
    adding an alignment pin to the first half;
    adding an alignment hole to the second half, wherein the alignment hole aligns with the alignment pin when the first half and the second half are joined.

5. The method of claim 3, prior to defining the cavity, receiving a second input indicating what smart device is to be embedded in the 3D object.

6. The method of claim 3, prior to defining the cavity, receiving a second input indicating a location within the 3D object for the smart device.

7. The method of claim 3, wherein the cavity is configured to leave at least a portion of one surface of the smart device exposed when the smart device is embedded in the 3D object.

8. The method of claim 3, further comprising modifying the 3D model to include a mechanism that enables a physical input to be received by the smart device while embedded in the 3D object.

9. The method of claim 3, further comprising modifying the 3D model to include a mechanism that enables the smart device to implement the smart object behavior while embedded in the 3D object.

10. One or more non-transitory computer-readable media storing instructions that, when executed by one or more processors, cause the one or more processors to perform the steps of:
    displaying a plurality of input event buttons and a plurality of output action buttons via a graphical user interface (GUI), wherein each input event button represents a different type of input event that can initiate a smart object behavior of the smart object and each output action button represents a different type of output action that can be included in the smart object behavior;
    receiving, via the GUI, a selection of a first input event button included in the plurality of input event buttons for defining a first set of parameters for a first type of input event corresponding to the first input event button and a selection of a first output action button included in the plurality of output action buttons for defining a second set of parameters for a first type of output action corresponding to the first output action button;
    receiving a first input indicating the smart object behavior of the smart object that includes a smart device embedded in a three-dimensional (3D) object, wherein the smart object behavior is performed in response to an input event that is detected by the smart device, wherein the input event comprises at least one of an image-based input, a magnet-based input, a motion-based input, an orientation-based input, a touchscreen-based input, a sound-based input, or a global positioning system (GPS)-based input, wherein the first input includes the first set of parameters for the first type of input event and the second set of parameters for the first type of output action, wherein the input event comprises the first type of input event and the smart object behavior includes the first type of output action;

in response to the first input, generating computer instructions for programming at least one function of the smart device, wherein the computer instructions, when executed by the smart device, cause the smart object to implement the smart object behavior; and transmitting, via a network, the computer instructions to the smart device.

11. The one or more non-transitory computer-readable media of claim 10, wherein the smart device detects the input event via at least one of a camera, a magnetometer, a global positioning system, a microphone, a touchscreen, a Web interface, or an accelerometer.

12. The one or more non-transitory computer-readable media of claim 10, wherein the computer instructions cause the smart device to generate at least one of a text display, an image display, a screen-based light output, a sound output, or a haptic output.

13. The one or more non-transitory computer-readable media of claim 10, further comprising:
receiving a 3D model of the 3D object;
defining a cavity within the 3D model that accommodates the smart device; and
separating the 3D model of the 3D object into a first half and a second half via a separation surface.

14. The one or more non-transitory computer-readable media of claim 13, further comprising:
adding an alignment pin to the first half;
adding an alignment hole to the second half, wherein the alignment hole aligns with the alignment pin when the first half and the second half are joined.

15. The one or more non-transitory computer-readable media of claim 13, prior to defining the cavity, receiving a second input indicating what smart device is to be embedded in the 3D object.

16. A system, comprising:
a smart object that includes:
a three-dimensional (3D) object configured to accommodate a smart device within a cavity; and
the smart device; and
a computing device that includes:
a memory that stores instructions, and
a processor that is coupled to the memory and, when executing the instructions, is configured to:
display a plurality of input event buttons and a plurality of output action buttons via a graphical user interface (GUI), wherein each input event button represents a different type of input event that can initiate a smart object behavior of the smart object and each output action button represents a different type of output action that can be included in the smart object behavior;
receive, via the GUI, a selection of a first input event button included in the plurality of input event buttons for defining a first set of parameters for a first type of input event corresponding to the first input event button and a selection of a first output action button included in the plurality of output action buttons for defining a second set of parameters for a first type of output action corresponding to the first output action button;
receive a first input indicating the smart object behavior of the smart object, wherein the smart object behavior is performed in response to an input event that is detected by the smart device, wherein the input event comprises at least one of an image-based input, a magnet-based input, a motion-based input, an orientation-based input, a touchscreen-based input, a sound-based input, or a global positioning system (GPS)-based input, wherein the first input includes the first set of parameters for the first type of input event and the second set of parameters for the first type of output action, wherein the input event comprises the first type of input event and the smart object behavior includes the first type of output action;
in response to the first input, generating computer instructions for programming at least one function of the smart device, wherein the computer instructions, when executed by the smart device, cause the smart object to implement the smart object behavior; and
transmitting, via a network, the computer instructions to the smart device.

17. The system of claim 16, wherein the smart device executes the computer instructions while disposed in the cavity.

18. The system of claim 16, wherein the 3D object includes a physical feature that enables the smart device to implement the smart object behavior.

19. The method of claim 1, wherein the smart object behavior is further performed in response to an additional input event that is detected by the smart device, wherein the additional input event comprises a touchscreen-based input.

20. The method of claim 1, wherein the smart object behavior is further performed in response to an additional input event that is detected by the smart device, wherein the additional input event comprises a sound-based input.

21. The method of claim 1, wherein the smart object behavior is further performed in response to an additional input event that is detected by the smart device, wherein the additional input event comprises a global positioning system (GPS)-based input.

22. The method of claim 1, further comprising displaying, via the GUI, a first programming element representing the selection of the first input event button, a second programming element representing the selection of the first output action button, and a first logical connection between the first programming element and the second programming element.

23. The one or more non-transitory computer-readable media of claim 10, further comprising displaying, via the GUI, a first programming element representing the selection of the first input event button, a second programming element representing the selection of the first output action button, and a first logical connection between the first programming element and the second programming element.

24. The system of claim 16, wherein the processor is further configured to display, via the GUI, a first programming element representing the selection of the first input event button, a second programming element representing the selection of the first output action button, and a first logical connection between the first programming element and the second programming element.

* * * * *